US008523655B2

(12) United States Patent
Lankots

(10) Patent No.: US 8,523,655 B2
(45) Date of Patent: Sep. 3, 2013

(54) METHOD AND SYSTEM FOR OPERATING A SECONDARY GAME IN CONJUNCTION WITH A PRIMARY GAME

(75) Inventor: Tiit Lankots, Tartu (EE)

(73) Assignee: Playtech Software Limited, Douglas (IM)

( * ) Notice: Subject to any disclaimer, the term of this patent is extended or adjusted under 35 U.S.C. 154(b) by 485 days.

(21) Appl. No.: 12/359,707

(22) Filed: Jan. 26, 2009

(65) Prior Publication Data

US 2009/0239636 A1 Sep. 24, 2009

Related U.S. Application Data

(63) Continuation-in-part of application No. PCT/IB2006/052566, filed on Jul. 26, 2006.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl.
USPC .................................. 463/20; 463/25; 463/29

(58) Field of Classification Search
USPC ................................................ 463/20, 25, 29
See application file for complete search history.

(56) References Cited

U.S. PATENT DOCUMENTS

| | | | | |
|---|---|---|---|---|
| 5,560,603 | A | 10/1996 | Seelig et al. | |
| 5,980,384 | A | 11/1999 | Barrie | |
| 6,227,969 | B1 | 5/2001 | Yoseloff | |
| 6,375,567 | B1 | 4/2002 | Acres | |
| 6,537,150 | B1 * | 3/2003 | Luciano et al. | 463/16 |
| 6,643,942 | B1 | 11/2003 | Russell | |
| 7,682,244 | B1 * | 3/2010 | Luciano et al. | 463/25 |
| 2002/0045472 | A1 | 4/2002 | Adams | |
| 2002/0183105 | A1 | 12/2002 | Cannon et al. | |
| 2003/0036422 | A1 | 2/2003 | Baerlocher et al. | |
| 2003/0060266 | A1 * | 3/2003 | Baerlocher | 463/20 |
| 2003/0069068 | A1 | 4/2003 | Kaminkow | |

(Continued)

FOREIGN PATENT DOCUMENTS

| | | | |
|---|---|---|---|
| WO | WO 2008/055291 | A1 | 5/2008 |
| WO | WO 2008/119105 | A1 | 10/2008 |

OTHER PUBLICATIONS

International Search Report for International Application No. PCT/IB2006/052566, mailed on Feb. 22, 2008.

*Primary Examiner* — William M. Brewster
(74) *Attorney, Agent, or Firm* — Oliff & Berridge, PLC

(57) ABSTRACT

The present invention discloses a computerized gaming system configured to support operating at least one secondary game in conjunction with a primary game and a method of operating thereof. The method of operating comprises activating a primary game based on simulating rotation of reels; activating a secondary game based on simulating rotation of reels; in response to a predefined player's input, providing a simulation of rotation of reels in the primary game thus giving rise to a primary spin; upon completion of the primary spin, automatically initiating and providing a simulation of rotation of reels in the secondary game thus giving rise to a secondary spin; generating one or more results for the primary game in accordance with the primary spin; generating one or more results for the secondary game in accordance with the secondary spin; and displaying the respective results. The results generated in accordance with the secondary spin are independent from the results generated in accordance with the primary spin.

30 Claims, 4 Drawing Sheets

(56) References Cited

U.S. PATENT DOCUMENTS

| | | | |
|---|---|---|---|
| 2003/0119580 | A1 | 6/2003 | McClintic et al. |
| 2003/0125101 | A1 | 7/2003 | Campo |
| 2003/0153378 | A1 | 8/2003 | Schlegel et al. |
| 2004/0053673 | A1 | 3/2004 | Mishra |
| 2004/0092302 | A1 | 5/2004 | Gauselmann |
| 2004/0155405 | A1 | 8/2004 | Marks et al. |
| 2005/0049039 | A1 | 3/2005 | Webb et al. |
| 2005/0054419 | A1 | 3/2005 | Souza et al. |
| 2005/0181860 | A1 | 8/2005 | Nguyen et al. |
| 2005/0230916 | A1 | 10/2005 | Schultz |
| 2006/0131809 | A1 | 6/2006 | Lancaster et al. |
| 2008/0161098 | A1 | 7/2008 | Nelson |
| 2008/0188279 | A1 | 8/2008 | Seelig et al. |

* cited by examiner

Prior Art

METHOD AND SYSTEM FOR OPERATING A SECONDARY GAME IN CONJUNCTION WITH A PRIMARY GAME

CROSS REFERENCE TO RELATED APPLICATIONS

The present application is a continuation-in-part of PCT application WO2008/012604 published Jan. 31, 2008. The entire content of the PCT application is hereby incorporated by reference in its entirety.

FIELD OF THE INVENTION

The present invention relates to computer games and, in particular, to secondary games that run in conjunction with primary games.

BACKGROUND OF THE INVENTION

Throughout the world many types of computer games have been developed and are used to play on personal computers or on terminals connected to mini-computers or larger systems. Typically computer games are used for enjoyment, for filling up time, for enhancing a person's skill, and even for earning money. Computer games provide the benefit of being able to play an intelligent game, for example without requiring additional players, complex environments and/or mechanical means. Some computer games are played solely by a single person, while others allow connecting to other computers over a network, for example over the Internet, and competing with other people.

Many games are centered on the concept of collecting points wherein, for example, the person is challenged to earn more points than other people who have played the game or are playing it simultaneously over a network. In some games people compete for money against the computer software, a server or against other players.

Each type of game provides the player with a certain type of challenge, for example some games are based on skill, some are based on luck and some are based on a combination of skill and luck. Some players play multiple games simultaneously using a multitasking operating system, for example if they do not find the single game challenging enough.

The problem of implementing multiple simultaneous games is known in the art and is disclosed, for example, in the following patents and patent applications:

U.S. Pat. No. 6,375,567 (Acres) discloses a method for operating a group of gaming machines interconnected by a network to play both primary and secondary games from the machines. Each of the gaming machines has a primary game associated with it. Play is allowed to occur on the gaming machines while a triggering event is detected. In a preferred embodiment, the triggering event is detected by monitoring an operating parameter of the gaming machines over the network, such as total coins played. A predetermined criterion or threshold is set for the operating parameter and, if the operating parameter meets the predetermined criterion, a triggering event signal is sent through the network. Upon the occurrence of the triggering event, a secondary game is initiated from a selected one of the gaming machines whereby the secondary game is common to the group of gaming machines.

US Patent Application No. 2003/060266 (Baerlocher) discloses an embodiment wherein the player must wager a number of paylines to qualify for one of a plurality of bonus games. The highest required number of paylines qualifies the player to play the main or most elaborate bonus game. The main or first bonus game preferably has the highest average payout per credit wagered. This provides an incentive to the player to play the highest required number of paylines. In an embodiment, any number of paylines less than the highest required number or max lines qualifies the player to play a second bonus game. The second bonus game has an average payout per credit wagered that is slightly less than the main bonus game.

US Patent Application No. 2003/119580 (Vorias et al.) discloses a gaming method including a bonus game associated with a base game that allows players to use skill and memory to determine the outcome of the bonus game. Players are prompted at the beginning of the bonus game to select at least a first and then a second game space from an array of game spaces, revealing previously hidden indicia. The player continues the selections for a predetermined period of time or until some event occurs, terminating the selections. Bonus payouts are awarded in the event the revealed indicia match. Alternative embodiments include allowing players to qualify for a "sneak peek", wherein all or some hidden indicia on the game space array are revealed for a short period of time, and random shuffling of the indicia to different game spaces.

US Patent Application No. 2004/053673A (Mishra) discloses a gaming apparatus having an ability to provide multiple winning events in a single play of an event. The apparatus may have a housing with a microprocessor, a first gaming display that displays at least one symbol from a first set of symbols wherein predetermined symbol displays provide a first award. There is also a second gaming display that coincidentally displays at least one separate symbol selected from among symbols within the first set of symbols. The gaming apparatus awards a second prize when the at least one separate symbol matches at least one symbol from among the symbol or symbols displayed in the first gaming display. The display for the second set of symbols is preferably active while the first gaming display is actively presenting the first set of symbols.

US Patent Application No. 2004/092302 (Gauselmann) discloses a video gaming machine displaying an array of symbols, wherein an award is granted based on any winning symbol combinations across activated paylines. As a secondary game, after the initial display of the symbols, the player may designate one species of symbol in the array. Then, one of the symbols in the array is selected at random by the gaming machine. If the symbol designated by the player is the one selected by the machine, the player wins a special award. The secondary game may be activated pursuant to any of a variety of events, or activated after each game. The player may designate the symbol species by means of a touch screen or any other type of controller.

US Patent Application No. 2005/054419 (Vorias et al.) discloses a gaming device and a method for operating thereof including interrelating bonus games in a bonus round by providing outcomes which transfer the player to one of the other interrelated bonus games. Each bonus game includes a different set of outcomes depending on what order the bonus game is selected by the gaming device or the player. Once an initial bonus game is selected, the player is presented with a plurality of selections which can include awards, award digits, modifiers, terminators, and other outcomes in addition to transfers to other bonus games.

US Patent Application No. 2005/230916 (Schultz) discloses a method for playing a bonus game in association with a main game. A bonus game is activated upon the occurrence of a predefined triggering event in the main game. Five cards are randomly drawn from an abridged deck of playing cards.

The abridged deck of playing cards comprises thirteen cards all of a single suit. As few as none and as many as all five of the dealt cards are discarded and replaced with a card from the abridged deck of playing cards. The final hand is awarded a bonus payout based on the final hand of cards.

SUMMARY OF THE INVENTION

In accordance with an aspect of the invention, there is provided a method of operating a computerized gaming system configured to support operating at least one secondary game in conjunction with a primary game, the method comprising:

a) activating a primary game based on simulating rotation of reels;

b) activating a secondary game based on simulating rotation of reels;

c) in response to a predefined player's input, providing a simulation of rotation of reels in the primary game thus giving rise to a primary spin;

d) upon completion of the primary spin, automatically initiating and providing a simulation of rotation of reels in the secondary game thus giving rise to a secondary spin;

e) generating one or more results for the primary game in accordance with the primary spin;

f) generating one or more results for the secondary game in accordance with the secondary spin; and g) displaying the respective results, wherein the results generated in accordance with the secondary spin are independent from the results generated in accordance with the primary spin.

In accordance with an embodiment of the invention, the displaying comprises displaying a status and/or score achieved by automated operating of the secondary game.

In accordance with an embodiment of the invention, the secondary game is activated and/or deactivated during the play of the primary game.

In accordance with an embodiment of the invention, the status and/or score of the secondary game is preserved when the secondary game is deactivated so that the secondary game can continue from where it left off when it is further activated during the play of the primary game.

In accordance with an embodiment of the invention, the method further comprises managing accounts for the primary game and for the secondary game, said accounts configured to enable deducting and/or accrediting points and/or funds during the play of respective game.

In accordance with a further embodiment of the invention, the accounts for the primary game and the secondary game are configured to enable independent management.

In accordance with a still further embodiment of the invention, the accounts for the primary game and the secondary game are configured in a manner enabling deducting and/or accrediting points and/or funds for the secondary game account from the account of the primary game.

In accordance with a still further embodiment of the invention, at least one of the games simulates a lottery game.

In accordance with an embodiment of the invention, at least one of the games simulates a slot machine game.

In accordance with an embodiment of the invention, the primary game differs from the secondary game.

In accordance with an embodiment of the invention, each primary spin automatically initiates a corresponding secondary spin.

In accordance with an aspect of the invention, there is provided a method of operating a gaming system supporting operating a secondary game in conjunction with a primary game, the method comprising:

a) activating the primary game;

b) activating the secondary game;

c) in response to a predefined player's input, generating a first random number, this first random number and/or derivatives thereof to be used as one or more results for the primary game;

d) upon successful generation of the first random number, automated generating a second random number, this second random number and/or derivatives thereof to be used as results for the secondary game; and e) displaying the respective results, wherein the results of first random number generation are independent of the results of the second random number generation.

In accordance with an embodiment of the invention, at least one of the games simulates a lottery game, in the above method.

In accordance with an embodiment of the invention, at least one of the games simulates a slot machine game, in the above method.

In accordance with an embodiment of the invention, the primary game differs from the secondary game, in the above method.

In accordance with an embodiment of the invention, each generation of random number for the primary game automatically initiates generation of random number for the secondary game, for the above method.

In accordance with an aspect of the invention, there is presented a computerized gaming system configured to support operating at least one secondary game in conjunction with a primary game, the system comprising:

a) computerized means configured to activate a primary game based on simulating rotation of reels;

b) computerized means configured to activate a secondary game based on simulating rotation of reels;

c) computerized means configured to simulate rotation of reels in the primary game in response to a predefined player's input, thus giving rise to a primary spin;

d) computerized means configured to automatically initiate and provide, upon completion of the primary spin, a simulation of rotation of reels in the secondary game thus giving rise to a secondary spin;

e) computerized means configured to generate one or more results for the primary game in accordance with the primary spin;

f) computerized means configured to generate one or more results for the secondary game in accordance with the secondary spin; and g) a display configured to display the respective results, wherein the results generated in accordance with the secondary spin are independent from the results generated in accordance with the primary spin.

In accordance with an embodiment of the invention, at least one of the games simulates a lottery game, in the above system.

In accordance with an embodiment of the invention, at least one of the games simulates a slot machine game, in the above system.

In accordance with an embodiment of the invention, the primary game differs from the secondary game, in the above system.

In accordance with an embodiment of the invention, primary spin automatically initiates corresponding secondary spin, in the above system.

In accordance with an embodiment of the invention, the above system includes enabling activating and/or deactivating the secondary game during the play of the primary game.

BRIEF DESCRIPTION OF THE DRAWINGS

The present invention will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "activating", "managing", "simulating" or the like, refer to the action and/or processes of a computer that manipulate and/or transform data into other data, said data represented as physical, such as electronic, quantities. The term "computer" should be expansively construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The operations in accordance with the teachings herein may be performed by a computer specially constructed for the desired purposes or by a general purpose computer specially configured for the desired purpose by a computer program stored in a computer readable storage medium.

Embodiments of the present invention are not described with reference to any particular programming language. It will be appreciated that a variety of programming languages may be used to implement the teachings of the inventions as described herein.

The references cited in the background teach many principles of implementing and managing computerized network games that are applicable to the present invention. Therefore the full contents of these publications are incorporated by reference herein where appropriate for appropriate teachings of additional or alternative details, features and/or technical background.

Figure 1:
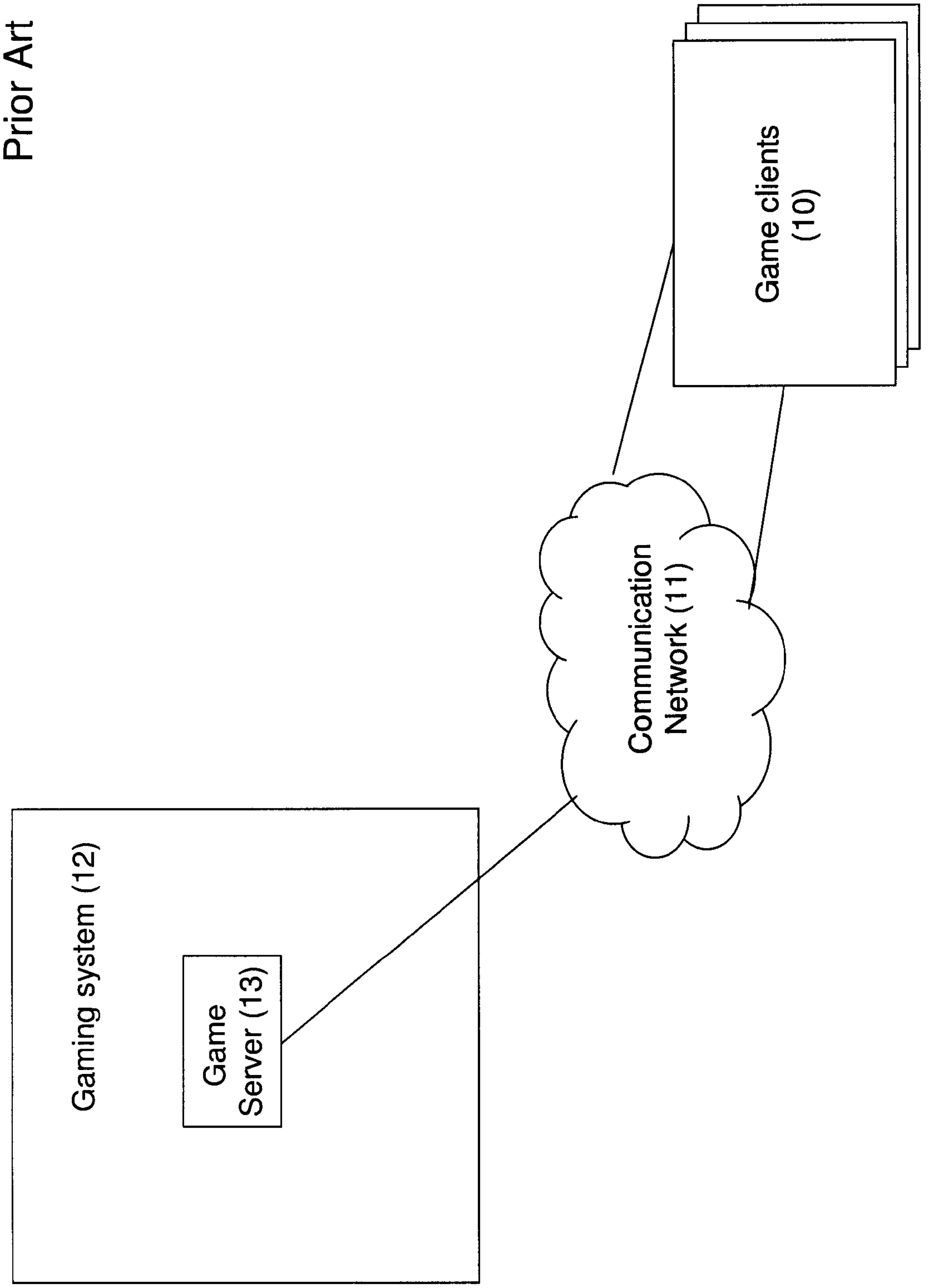
FIG. 1 illustrates a generalized network environment wherein the present invention may be implemented.

Bearing this in mind, attention is drawn to FIG. 1 illustrating a generalized network environment wherein the present invention may be implemented. The illustrated network environment comprises a plurality of game clients 10 operatively coupled to a game server 13 comprised in a gaming system 12. The game clients may be associated with any device having input and display capabilities (e.g. personal computer, workstation, PDA, mobile phone, WebTV device, wagering machine, gaming machine, etc.) and capable to communicate with the game server 13 directly or via communication network 11 (e.g. Wireline or Wireless Public Telephone Networks, Internet, Intranet, cable network, etc.). Optionally, such a device may further have a video capturing capabilities device and/or audio output capabilities.

The game clients may be downloaded to the respective device and/or accessed with the help of such a device from the web via a web browser. In certain embodiments of the invention the device shall be also capable to execute at least part of a gaming application. In certain embodiments of the invention the game clients and/or servers may be directly associated with the gaming system 12 (e.g. a game system in a land-based casino may support one or more directly associated clients and/or servers).

In certain embodiments of the invention there may be provided an exchange of live video/audio inputs between the clients (and/or associated devices) and the game server. A part of the respective display capabilities may be reserved for the showing of the video image of the other players and/or dealer.

The game server 13 is configured to receive input data from one or more game clients, to execute logic of one or more certain games accordingly, and to report outcome(s) to the game clients in accordance with gaming principles and rules. Server 13 may be configured as a server-side gaming application, wherein each gaming client 10 may be configured to execute the corresponding client-side. The sharing of functions between the game server and the game clients may vary depending on the game and implementation thereof, for example the game client may provide only functions of input/output and/or additionally execute certain programs related to output graphics and/or additionally execute part or all programs related to a game logic and exchange the data with the game server, etc. It will be appreciated that server and/or the clients can alternatively be implemented as firmware ported for a certain processor such as, by way of non-limiting example, digital signal processor (DSP) or microcontrollers, or can be implemented as hardware or configurable hardware such as, by way of non-limiting example, field programmable gate array (FPGA) or application specific integrated circuit (ASIC).

The gaming system may comprise other servers (not shown) operatively coupled to the game server, as, by way by way of non-limiting example, storage server, billing server, security server, administration server, live game server and others. Optionally, functionality of these servers or part thereof may be provided by the game server.

Note that the invention is not bound by the specific architecture described with reference to FIG. 1. Those versed in the art will readily appreciate that the invention is, likewise, applicable to any architecture facilitating computerized gaming.

Figure 2:
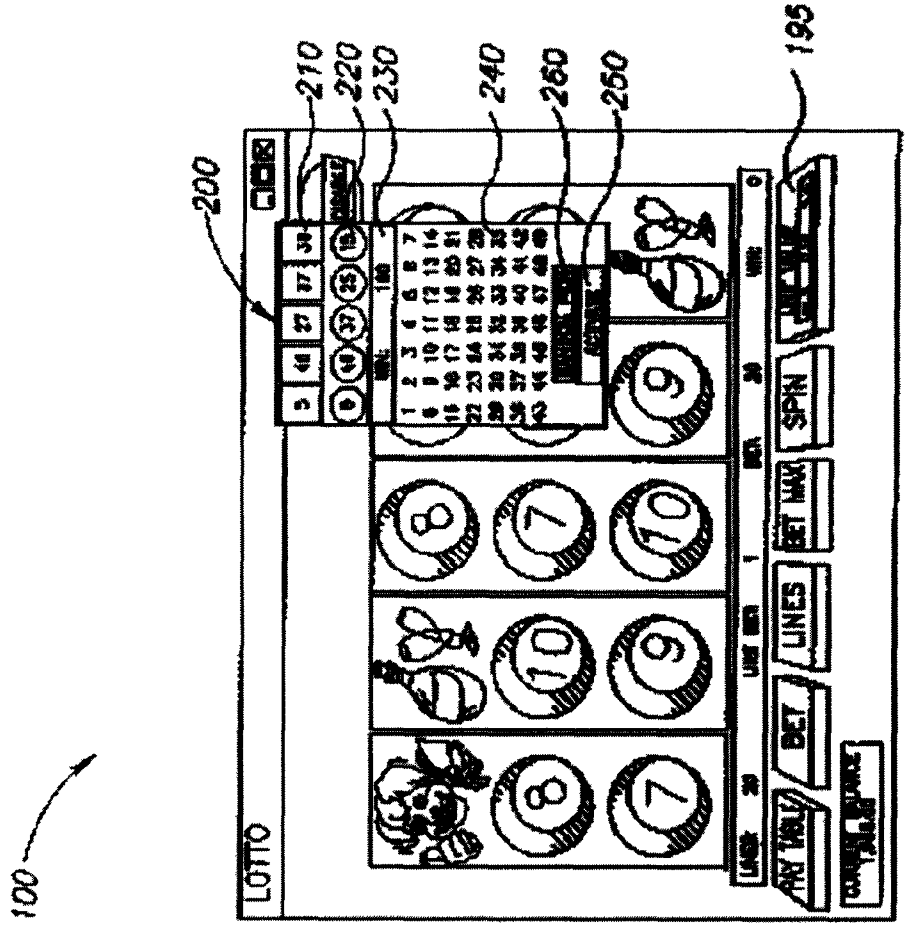
FIG. 2 schematically illustrates a computer display presenting an initialization screen of a secondary game in accordance with certain embodiments of the present invention.

Referring to FIG. 2, there is a schematic illustration of a computer display 100 showing the implementation of a secondary game in conjunction with a primary game in accordance with certain embodiments of the invention.

In the exemplary embodiment of the invention illustrated, by way of non-limiting example in FIG. 2, the primary game is a slot game based on rotation of a pre-selected number of reels (e.g. 5 reels) and implemented in any suitable way known in the art. Optionally, a few rows (e.g. 3) of the reels are shown simultaneously on display 100. A player may press a spin button causing the 5 reels to rotate for an independent random amount of time. After the reels stop rotating, the resulting values shown in the rows on display 100 are analyzed to determine a score to be awarded to the user. A "bet" button allows the player to select the number of units (e.g. from 1-10), which will be deducted from the user's account per participating line, and serve as the basis for calculating the number of points awarded due to successful spin results. Optionally, the player may select to bet the maximum allowed amount by pushing a "max bet" button. The "bet" button or "max bet" button may set the game to deduct from the player's account the respective number of points resulting from spin results.

In an exemplary embodiment of the invention, the display provides the player with a current balance window which shows the balance of points in the player's account. Optionally, a status line is positioned below the displayed rows, and provides the player with information regarding the number of lines that will be used for the next spin, the number of points bet per line, the total bet, and the number of points won from the currently displayed values.

In an exemplary embodiment of the invention, display 100 comprises a symbol with a push button (not shown) to enable a secondary game which may be played simultaneously with the primary game in accordance with certain embodiments of the present invention. Optionally, when pushing the enable button for the first time during the primary game or if the secondary game had been closed, an initialization screen 200 will open up to enable initialization of the secondary game.

By way of non-limiting example, the illustrated secondary game is a lotto based game based on rotation of a pre-selected number of reels. The player can choose a set of numbers and when, resulting from the reels rotation, some of the numbers come up, the player wins a prize depending on the number of hits.

Those versed in the art will readily appreciate that the invention is not bound by the illustrated games and is, likewise, applicable to any two or more games, each one based on rotation of a respective number of reels. Also those versed in the art will readily appreciate that the rotation (spin) of reels may be simulated with a help of a random number generator or in any other suitable way.

The illustrated initialization screen 200 provides the player with a list of values 240, for example between 40 to 60 values although more or less values may be provided. Optionally, the player is required to select a predetermined number of values, for example 5 or 6 values from list of values 240. In an exemplary embodiment of the invention, the selected values are displayed in area 210, for example at the top of the secondary game display. Once the player has pressed the activation button and has selected the values, the secondary game can begin. Optionally, the computer may also select values on behalf of the player who may request the computer to randomly (or otherwise) pick values for him/her by pushing a random pick button 260.

In accordance with certain embodiments of the invention, each spin in the primary game (referred to hereinafter as a "primary spin") automatically activates a spin in the secondary game (referred to hereinafter as a "secondary spin"), wherein the outcomes of the primary spin and the secondary spin are independent. The secondary spin may be activated synchronously with the primary spin or with a predefined delay.

In other embodiments of the invention primary and secondary spins may be connected by a certain predefined function. For example each M primary spins may activate N secondary spins, wherein M and N are natural numbers. The predefined delay between primary and secondary spins may also be a function of M and N.

Upon initiating the secondary game and providing initial setting, there is no need in a player's further involvement in the secondary game. Once the player (or computer on his behalf) has selected values for playing the game, the initialization screen may be automatically closed leaving a smaller status display for following the progress of the secondary game while playing the primary game. Each next step in the secondary game is activated by a respective next primary spin, wherein the outcomes of each step in the secondary game are independent from outcomes of the primary spin or player's actions in the primary game (apart from triggering the primary spin). In some embodiments of the invention, the initialization screen is not automatically closed, so as to enable the player to change the selected values, for example the values in area 210 may function as in a FIFO buffer, wherein each new value selected by the player will push out one value of the previously selected values. The player may close the initialization screen by pushing an activation button 250, thus confirming the secondary game setting and enabling the secondary game play.

In the illustrated embodiment, the secondary game, per reel rotation, randomly selects a single value from list 240 and displays it in an area 220 that is set aside and configured to display the selected values. Optionally, the player will be awarded a certain number of points for each value selected by the player and matching a computer selected value. In an exemplary embodiment of the invention, for each number of matching values a pre-selected number of points is awarded, for example two matches may give 10 points, three matches 50 points, four matches 1000 points and five matches 1,000,000 points. Optionally, the number of points won by the player will be displayed in an area 230 for the secondary game. The player can change the secondary game settings and/or disable the secondary game at any stage.

Figure 3:
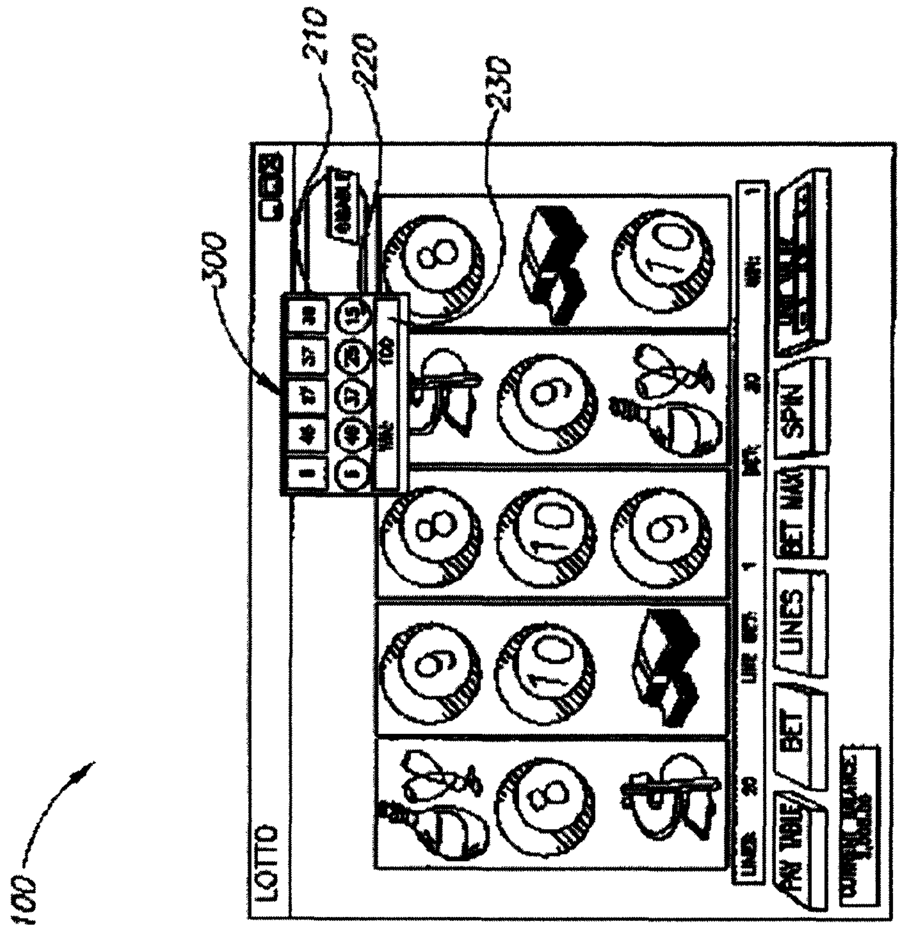
FIG. 3 schematically illustrates a computer display presenting a status display of a secondary game during playing a primary game, according to certain embodiments of the present invention.

FIG. 3 schematically illustrates a computer display 100 showing the status display 300 of the secondary game during playing the primary game. In the illustrated exemplary embodiment of the invention the status display shows the values selected by the player in area 210, the computer generated values as they are presented in area 220 and the current winnings in area 230. The generated values and player's winnings may be updated after each secondary spin.

In some embodiments of the invention, the value of the basic bet unit for the secondary game may be set as a function of the basic bet value set in the primary game. Alternatively, the secondary game may have a pre-defined bet value which is independent of the value in the primary game. In some embodiments of the invention, the primary and secondary game use a common point account, or, alternatively, the two games may use separate accounts.

In some embodiments of the invention, the display for the secondary game is positioned in a constant position on display 100. Alternatively, the display of the secondary game may form a window over the primary game and the user may position it freely anywhere on the screen. In some embodiments of the invention the display for the secondary game is limited in size, for example up to a fourth of the size of the screen, to prevent blocking the primary game.

Figure 4:
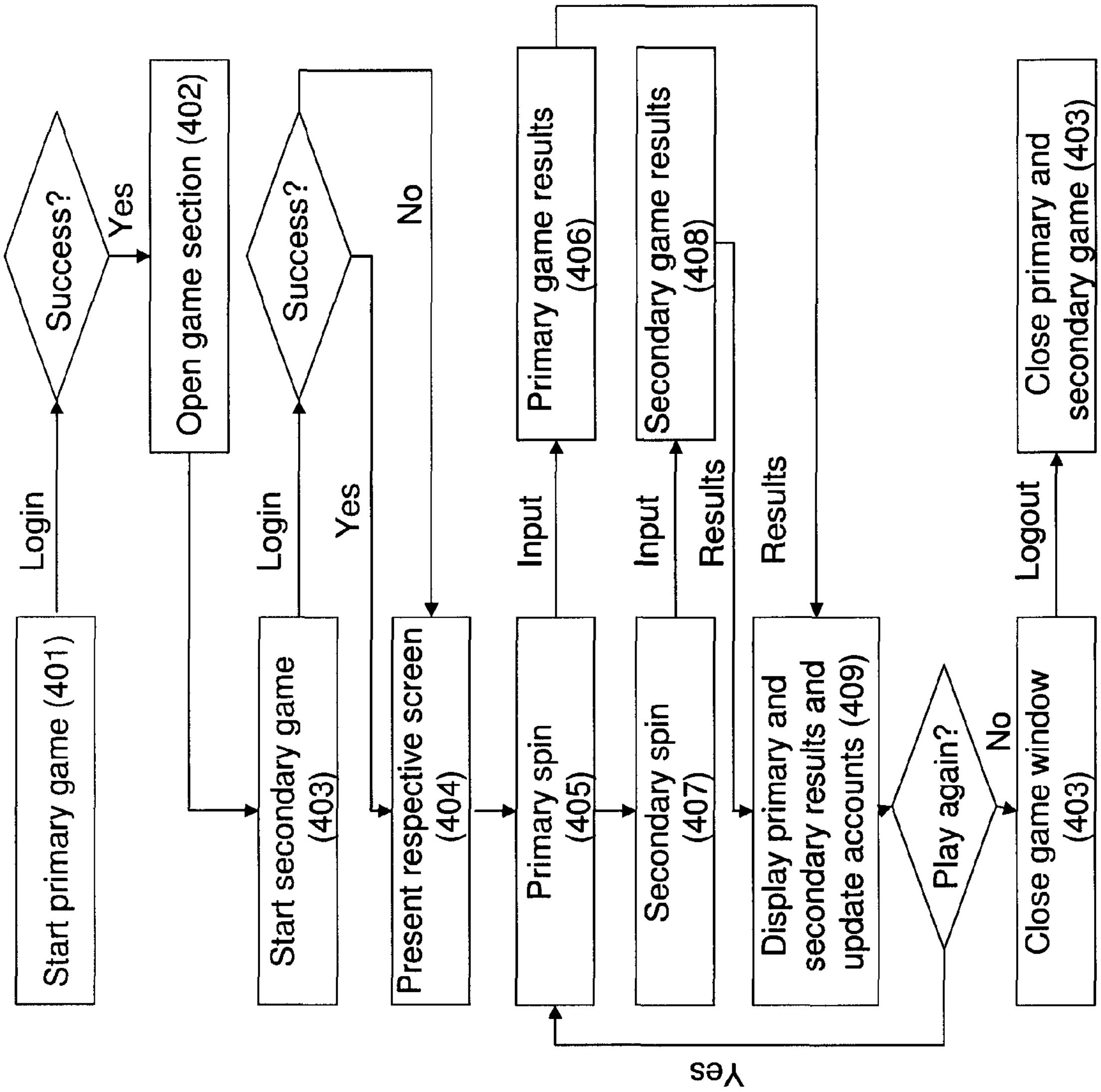
FIG. 4 illustrates a schematic flowchart of a method of operating the gaming system in accordance with certain embodiments of the present invention.

FIG. 4 illustrates a schematic flowchart of a method of operating the gaming system in accordance with certain embodiments of the present invention. Operations 401-404 illustrate a login process. Upon initiating (401) the login process for a primary game, the game system starts (402) the respective game session and the client is enabled to initiate (403) a secondary game. The login command that is sent to the game server for the secondary game may be similar to the regular login command used in all games, but includes a prefix that identifies the respective primary game, for example:

COMMAND_GAMECOMMAND+primaryGameID+COMMAND_GAMECOMMAND+secondaryGameID+COMMAND_GAMELOGIN+parameters.

The game server responds to the login command to indicate whether the login has been successful, for example:

COMMAND_GAMECOMMAND+ERR_OK+primaryGameID+COMMAND_GAMECOMMAND+secondarysideGameID+COMMAND_GAMELOGIN+err_code When the login (403) is successful (err_code=ERR_OK (0)), the client can play the secondary game in conjunction with the primary game. If the login fails, the secondary game shall be disabled, wherein the primary game can be played as normal. Accordingly, the playing system presents the screen corresponding to enabled or to disabled secondary game.

When the primary game starts, a certain player's action activates a reel rotation (405) in the primary game (primary spin). Player's actions activating a reel rotation in the primary game are pre-defined for each game. Completed with no errors primary spin generates (406) results for the primary game, and automatically activates a reel rotation (407) in the secondary game (secondary spin). The secondary spin generates (408) results for the secondary game, said results being independent of the results for the primary game. In certain embodiments of the invention this may be implemented as follows:

a) in response to a player's action, generating a first random number by a Random Number Generator (RNG) comprised in the gaming system, this first random number and/or derivatives thereof to be used as results for the primary game;

b) upon successful generating the first random number, automated generating a second random number, this second random number and/or derivatives thereof to be used as results for the secondary game, wherein the results of first random number generation are independent of results of the second random number generation.

The results (and/or derivatives thereof) of the primary spin and the secondary spin are displayed (409) on the game screen, and accounts for the games are updated accordingly. In certain embodiments of the invention, for example, when the primary and the secondary games have an equal number of reels and/or each primary spin automatically causes a secondary spin, the respective results may be displayed simultaneously. Alternatively, for example, in embodiments with M primary reels and N secondary reels and/or primary and secondary spins connected by certain function (e.g. each secondary spin triggered by X primary spins), the results for each game may be updated in accordance with performing the corresponding spin.

By way of non-limiting example, when the primary game spin is completed and a client receives corresponding results from the game server, the client automatically sends to the game server a gameplay command related to the secondary game:

COMMAND_GAMECOMMAND+hostGameId+COMMAND_GAMECOMMAND+sideGameID+COMMAND_SIDEGAME_PLAY+playCommand+inputInfo, where "playcommand" is the command name of the gameplay command (e.g. COMMAND_LOTTOSIDEBET_DEAL), and "inputInfo" is the player's input information for the certain secondary game (e.g., for lotto secondary game the inputInfo may contain the player's bet and the chosen numbers: bet+number1+ . . . +number5).

Accordingly, the server responds to the gameplay command with the results:

COMMAND_GAMECOMMAND+ERR_OK+hostGameId+COMMAND_GAMECOMMAND+ERR_OK+sideGameID+COMMAND_SIDEGAME_PLAY+ERR_OK+playcommand+ERR_OK+resultInfo where "resultInfo" is respective the game's results (e.g. ball1+ . . . +ball5).

If the player decides to continue the game, the operations 405-409 are repeated.

When the player closes (410) the primary game, the client sends a logout command to the game server to close the primary game (411). The secondary game is closed automatically upon receiving a logout command for the primary game, with no need for an additional logout command for the secondary game.

Optionally, once the secondary game commences, for example by generating the full number of required values, the secondary game may shut down, or automatically open an initialization screen so that the player may reinitialize it with the same selection of values or a new selection of values. In some embodiments of the invention, the secondary game charges the player for each turn wherein a value is generated for the player, alternatively, the secondary game charges the player at the beginning of each round when the computer begins to generate a new set of values to match the player selected values. Optionally, the player may disable the secondary game at any time to prevent further charges.

In some embodiments of the invention, a game system may comprise multiple primary games, which incorporate the same or different secondary game. Alternatively or additionally, the primary game may be played in conjunction with multiple secondary games.

Those skilled in the art will readily appreciate that various modifications and changes can be applied to the embodiments of the invention as hereinbefore described without departing from its scope, defined in and by the appended claims.

The invention claimed is:

1. A method of operating a computerized gaming system configured to support operating at least one secondary game in conjunction with a primary game, the method comprising:

a) activating a primary game based on simulating rotation of reels;

b) activating a secondary game based on simulating rotation of reels, wherein the secondary game is activated independently of an outcome of the primary game;

c) in response to a predefined player's input, providing a simulation of rotation of reels in the primary game thus giving rise to a primary spin;

d) responsive to providing the primary spin, automatically initiating and providing a simulation of rotation of reels in the secondary game thus giving rise to a secondary spin, wherein the secondary spin is initiated independently of an outcome of the primary spin;

e) generating one or more results for the primary game in accordance with the primary spin;

f) generating one or more results for the secondary game in accordance with the secondary spin; and g) displaying the respective results, wherein the results generated in accordance with the secondary spin are independent from the results generated in accordance with the primary spin.

2. The method of claim 1 wherein said displaying comprises displaying a status and/or score achieved by automated operating of the secondary game.

3. The method of claim 2, wherein the secondary game is activated and/or deactivated during the play of the primary game.

4. The method of claim 3, wherein the status and/or score of the secondary game is preserved when the secondary game is deactivated so that the secondary game can continue from where it left off when it is further activated during the play of the primary game.

5. The method of claim 1 further comprising managing accounts for the primary game and for the secondary game, said accounts configured to enable deducting and/or accrediting points and/or funds during the play of respective game.

6. The method of claim 5 wherein the accounts for the primary game and the secondary game are configured to enable independent management.

7. The method of claim 5, wherein the accounts for the primary game and the secondary game are configured in a manner enabling deducting and/or accrediting points and/or funds for the secondary game account from the account of the primary game.

8. The method of claim 1, wherein at least one of the games simulates a lottery game.

9. The method of claim 1 wherein at least one of the games simulates a slot machine game.

10. The method of claim 1 wherein the primary game differs from the secondary game.

11. The method of claim 1 wherein each primary spin automatically initiates a corresponding secondary spin.

12. A method of operating a gaming system supporting operating a secondary game in conjunction with a primary game, the method comprising:

a) activating the primary game;

b) activating the secondary game, wherein the secondary game is activated independently of a result of the primary game;

c) in response to a predefined player's input, generating a first random number, this first random number and/or derivatives thereof to be used as one or more results for the primary game;

d) responsive to successful generation of the first random number, automated generating a second random number, this second random number and/or derivatives thereof to be used as results for the secondary game, wherein generating the second random number is initiated independently of a result of the primary game; and e) displaying the respective results, wherein the results of first random number generation are independent of the results of the second random number generation.

13. The method of claim 12, wherein at least one of the games simulates a lottery game.

14. The method of claim 12 wherein at least one of the games simulates a slot machine game.

15. The method of claim 12 wherein the primary game differs from the secondary game.

16. The method of claim 12 wherein each generation of random number for the primary game automatically initiates generation of random number for the secondary game.

17. A computerized gaming system configured to support operating at least one secondary game in conjunction with a primary game, the system comprising:

a) computerized means configured to activate a primary game based on simulating rotation of reels;

b) computerized means configured to activate a secondary game based on simulating rotation of reels, wherein the secondary game is activated independently of an outcome of the primary game;

c) computerized means configured to simulate rotation of reels in the primary game in response to a predefined player's input, thus giving rise to a primary spin;

d) computerized means configured to automatically initiate and provide, in response to providing the primary spin, a simulation of rotation of reels in the secondary game thus giving rise to a secondary spin, wherein the secondary spin is initiated independently of a result of the primary spin;

e) computerized means configured to generate one or more results for the primary game in accordance with the primary spin;

f) computerized means configured to generate one or more results for the secondary game in accordance with the secondary spin; and g) a display configured to display the respective results, wherein the results generated in accordance with the secondary spin are independent from the results generated in accordance with the primary spin.

18. The system of claim 17, wherein at least one of the games simulates a lottery game.

19. The system of claim 17 wherein at least one of the games simulates a slot machine game.

20. The system of claim 17 wherein the primary game differs from the secondary game.

21. The system of claim 17 wherein primary spin automatically initiates corresponding secondary spin.

22. The system of claim 17, enabling activating and/or deactivating the secondary game during the play of the primary game.

23. A computer program product comprising computer program code means for causing the computer to perform all the stages of claim 1 when said program product is run on a computer.

24. A computer program as claimed in claim 23 embodied on a non-transitory computer readable medium.

25. The method of claim 1 wherein the secondary spin is activated with a predefined delay after the primary spin.

26. The method of claim 1 wherein each M primary spins activate N secondary spins, where M and N are natural numbers.

27. The method of claim 1 wherein each next spin in the secondary game is activated by a respective next primary spin, wherein the outcomes of each step in the secondary game are independent from outcomes of the respective primary spin.

28. The system of claim 17 wherein the secondary spin is activated with a predefined delay after the primary spin.

29. The system of claim 17 wherein each M primary spins activate N secondary spins, where M and N are natural numbers.

30. The system of claim 17 wherein each next spin in the secondary game is activated by a respective next primary spin, wherein the outcomes of each step in the secondary game are independent from outcomes of the respective primary spin.

* * * * *